United States Patent Office 2,881,187
Patented Apr. 7, 1959

2,881,187

1-ETHERS, THIOETHERS AND ESTERS OF 4,5,6,7, 10,10-HEXACHLORO - 4,7 - METHYLENE - 4,7,8,9-TETRAHYDROPHTHALANE

Hans Feichtinger and Siegfried Puschhof, Duisburg-Beeck, Germany, assignors to Ruhrchemie Aktiengesellschaft, Oberhausen-Holten, Germany, a corporation of Germany No Drawing. Application November 5, 1956
Serial No. 620,217

Claims priority, application Germany November 5, 1955

4 Claims. (Cl. 260—346.2)

This invention relates to, and has as its object, the production of 1-ethers, thioethers and esters of 4,5,6,7,10,10-hexachloro-4,7 - methylene - 4,7,8,9 - tetrahydrophthalane which have been found to constitute excellent insecticides, fungicides and bactericides, which are useful for pharmaceutical purposes, and for the synthesis of further derivatives.

The 1-ethers, thioethers and esters, in accordance with the invention, have the general formula:

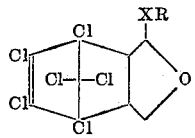

in which X represents O, S, or the

group, and R represents a saturated or unsaturated alkyl radical or aryl radical, which may contain additional substituents such as chlorine atoms.

The novel ethers, thioethers and esters, in accordance with the invention may be produced from the known 4,5,6,7,10,10-hexachloro-4,7-methylene - 4,7,8,9 - tetrahydrophthalane, which is obtained, for example, from hexachlorocyclopentadiene by the addition of 2,5-dihydrofurane or by reaction with cisbutene-(2)-diol-(1,4) and subsequent dehydration and which has a melting point of about 233° C. The production of the hexachloromethylene tetrahydrophthalane has been described in the Dutch Patent 83,106.

In accordance with the invention, the starting hexachloro-methylene-tetrahydrophthalane is bromated, which suprisingly results in the mono-substituted 1-bromo-4,5,6,7,10,10-hexachloro-4,7-methylene - 4,7,8,9 - tetrahydrophthalane, in accordance with the following reaction scheme:

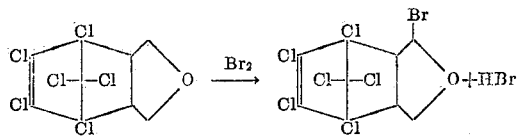

Surprisingly, this bromination does not proceed in the same manner of the chlorination, which gives an excellent yield of 1,3,4,5,6,7,10,10-octachloro-4,7-methylene-4,7,8,9-tetrahydrophthalane.

The bromination may be effected in the conventional manner with any of the known or conventional bromination agents as, for example, bromine or bromosuccinimide.

The monobromo derivative is obtained in a yield of 92% of the theoretically possible yield and in addition to constituting the starting product for the formation of the ethers, thioethers and esters in accordance with the invention may be used for a number of other reactions.

In order to produce the 1-ethers and 1-thioethers in accordance with the invention, the starting 1-bromo compound is reacted with an alcohol, phenol or mercaptan and the reaction proceeds as follows:

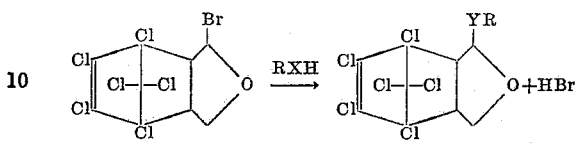

in which Y represents oxygen or sulfur and R is as set forth above, as, for example, one of the following radicals: $CH_3$, $C_2H_5$, $CH(CH_3)_2$, $(CH_2)_2CH_3$, $(CH_2)_3CH_3$, $CH(CH_2CH_3)_2$, $CH_2CH_2Cl$, $CH_2CH=CH_2$, $C_6H_5$, $C_6H_4$—p—Cl.

In order to form the 1-esters, the starting 1-bromo compound is reacted with an organic acid anhydride, in accordance with the following reaction scheme:

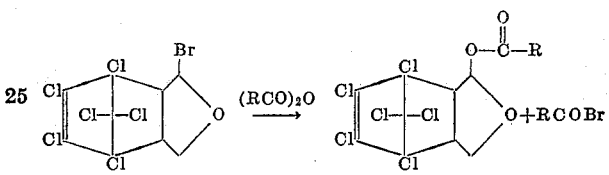

in which R is as set forth above.

The reactions with the alcohols, phenols and mercaptans or organic acid anhydrides can be effected in a very simple manner by merely contacting the reactants at a temperature between about 50–200° C. as, for example, by heating the same under a reflux condenser or in a closed tube. After the conversion, the reaction product may be freed by distillation from the component which is used in excess. The pure compound may then be obtained by distillation under vacuum, and preferably under a high vacuum, or by crystallization.

As mentioned, the novel compounds produced in accordance with the invention constitute excellent insecticides, fungicides or bactericides, and exhibit pharmaceutically valuable properties. Due to their structure, the new compounds may also be used for the production of various further derivatives.

The following examples are given by way of illustration and not limitation:

*Example 1*

34.4 grams (0.100 mol) of 4,5,6,7,10,10-hexachloro-4,7-methylene-4,7,8,9-tetrahydrophthalane were dissolved in 200 cc. of carbon tetrachloride. The solution was heated to the boiling temperature and, while irradiating with ultra-violet light, 17 grams of bromine were added dropwise to the boiling solution within one hour. Upon completion of the reaction, the solvent was distilled off under vacuum and the residue was recrystallized from petroleum ether. A yield of 39.8 grams (92% of the theoretical yield) of 1-bromo-4,5,6,7,10,10-hexachloro-4,7-methylene-4,7,8,9-tetrahydrophthalane melting at 75° C. was obtained.

Formula: $C_9H_5OCl_5Br$. Molecular weight: 421.79.

|    | Calculated, percent | Found, percent |
|----|---------------------|----------------|
| Cl | 50.44               | 51.04          |
| Br | 18.96               | 18.32          |

*Example 2*

137.0 grams (0.400 mol) of 4,5,6,7,10,10-hexachloro-4,7-methylene-4,7,8,9-tetrahydrophthalane, 142 grams of N-bromo-succinimide and 2 grams of benzoyl peroxide were suspended in 300 cc. of carbon tetrachloride and refluxed for some time. The succinimide formed was separated by filtration and the filtrate was concentrated under vacuum. Vacuum distillation at 0.25 mm. Hg resulted in 118 grams (70% of the theoretical yield) of 1-bromo-4,5,6,7,10,10-hexachloro-4,7-methylene - 4,7,8,9-tetrahydrophthalane having a boiling point of 142–148° C. Upon recrystallization from gasoline the product had a melting point of 75° C.

Example 3

4.2 grams (0.010 mol) of 1-bromo-4,5,6,7,10,10-hexachloro-4,7-methylene-4,7,8,9 - tetrahydrophthalane were refluxed with 16 grams (0.500 mol) of methyl alcohol for 8 hours. The solution was then concentrated under vacuum to about ⅓ of its volume. After cooling of the residue to —10° C., 1-methoxy-4,5,6,7,10,10-hexachloro-4,7-methylene-4,7,8,9-tetrahydrophthalane melting at 95° C. crystallized in an almost quantitative yield.

Formula: $C_{10}H_8O_2Cl_6$. Molecular weight: 372.90.

|  | Calculated, percent | Found, percent |
|---|---|---|
| C | 32.21 | 32.08 |
| H | 2.12 | 2.33 |
| O | 8.58 | 8.34 |
| Cl | 57.05 | 57.66 |

Example 4

By refluxing the bromide formed in Example 1 with the corresponding alcohols for 8 hours in the manner described in Example 3, the following 1-alkoxy compounds were produced:

|  | Melting point, °C. | Refractive index, $n_D^{20}$ |
|---|---|---|
| 1-ethoxy - 4,5,6,7,10,10 - hexachloro - 4,7 - methylene-4,7,8,9-tetrahydrophthalane | 97 | |
| 1-propoxy -4,5,6,7,10,10 - hexachloro - 4,7 - methylene-4,7,8,9-tetrahydrophthalane | oil | 1.5345 |
| 1-butoxy - 4,5,6,7,10,10-hexachloro-4,7 - methylene-4,7,8,9-tetrahydrophthalane | oil | 1.5295 |

Example 5

8.4 grams (0.019 mol) of 1-bromo-4,5,6,7,10,10-hexachloro-4,7-methylene - 4,7,8,9 - tetrahydrophthalane and 16.0 grams (0.199 mol) of 1-chlorethanol-(2) were heated for 8 hours on a water bath and the reaction product was processed by vacuum distillation. This resulted in a yield of 8.2 grams (98% of the theoretical yield) of 1-(β-chlorethoxy) - 4,5,6,7,10,10-hexachloro-4,7-methylene-4,7,8,9-tetrahydrophthalane having a boiling point of 135–145° C. at 0.08 mm. Hg and a refractive index, $n_D^{20}$, of 1.5490.

Formula: $C_{11}H_9O_2Cl_7$. Molecular weight: 421.38.

|  | Calculated, percent | Found, percent |
|---|---|---|
| C | 31.35 | 31.85 |
| H | 2.15 | 2.25 |

Example 6

8.4 grams (0.019 mol) of bromide were reacted with 24.4 grams (0.100 mol) of 1-chlorpentanol-(3) in the manner described in Example 5. By vacuum distillation, 1 - (γ-chlor-α-ethylpropoxy) - 4,5,6,7,10,10 - hexachloro-4,7-methylene-4,7,8,9-tetrahydrophthalane was obtained in amount of 52% of the theoretically possible yield. The product had a boiling point of 215–225° C. at 1.0 mm. Hg and a refractive index, $n_D^{20}$, of 1.5340.

Formula: $C_{14}H_{15}O_2Cl_7$. Molecular weight: 463.46.

|  | Calculated, percent | Found, percent |
|---|---|---|
| C | 36.27 | 36.30 |
| H | 3.26 | 3.36 |
| Cl | 53.56 | 53.20 |

Example 7

21.1 grams (0.050 mol) of 1-bromo-4,5,6,7,10,10-hexachloro-4,7-methylene-4,7,8,9-tetrahydrophthalane, in the manner described in Example 5, were reacted with 116.0 grams (1.995 mols) of allyl alcohol and processed. This resulted in 18.7 grams (94% of the theoretical yield) of 1-allyloxy-4,5,6,7,10,10-hexachloro - 4,7 - methylene-4,7,8,9-tetrahydrophthalane, having a boiling point of 115–120° C. at 0.009 mm. Hg and a refractive index, $n_D^{20}$, of 1.5431.

Formula: $C_{12}H_{10}O_2Cl_6$. Molecular weight: 398.94.

|  | Calculated, percent | Found, percent |
|---|---|---|
| C | 36.12 | 35.84 |
| H | 2.53 | 2.54 |
| Cl | 53.6 | 61.0 |

Example 8

8.4 grams (0.019 mol) of bromo-4,5,6,7,10,10-hexachloro - 4,7 - methylene-4,7,8,9-tetrahydrophthalane and 2.8 grams (0.0297 mol) of phenol were heated for 8 hours on a water bath. The reaction product which was dissolved in about 50 cc. of ether was washed with caustic soda solution to remove the excess phenol. The remaining ether phase was concentrated by evaporation and the residue was distilled under vacuum. 1-phenoxy-4,5,6,7,10,10 - hexachloro - 4,7 - methylene-4,7,8,9-tetrahydrophthalane having a boiling point of 170–180° C. at 0.009 mm. Hg was obtained in amount of 6.1 grams (70% of the theoretical yield).

|  | Calculated, percent | Found, percent |
|---|---|---|
| C | 41.41 | 41.03 |
| H | 2.32 | 2.69 |
| Cl | 48.91 | 48.82 |

Example 9

4.2 grams (0.010 mol) of the starting bromide of Example 8 and 2.0 grams (0.0155 mol) of p-chlorphenol were reacted and treated in the manner described in Example 8. 1 - (p-chlorphenoxy) - 4,5,6,7,10,10 - hexachloro-4,7-methylene-4,7,8,9-tetrahydrophthalane having a boiling point of 180–190° C. at 0.01 mm. Hg was obtained in amount of 25% of the theoretically possible yield.

Formula: $C_{15}H_9O_2Cl_7$. Molecular weight: 469.42.

|  | Calculated, percent | Found, percent |
|---|---|---|
| C | 38.37 | 38.21 |
| H | 1.93 | 2.05 |
| Cl | 52.87 | 52.49 |

Example 10

4.2 grams (0.010 mol) of 1-bromo-4,5,6,7,10,10-hexachloro-4,7-methylene-4,7,8,9-tetrahydrophthalane and 6.2 grams (0.100 mol) of ethylmercaptan were heated for 8 hours at 100° C. in a sealed glass tube. The reaction product obtained was distilled under vacuum. 1-ethylmercapto - 4,5,6,7,10,10-hexachloro-4,7-methylene-4,7,8, 9-tetrahydrophthalane having a boiling point of 110–120° C. at 0.02 mm. Hg and a refractive index, $n_D^{20}$, of 1.5668 could be isolated in amount of 3.5 grams (87% of the theoretical yield).

Formula: $C_{11}H_{10}OSCl_6$. Molecular weight: 406.99.

|  | Calculated, percent | Found, percent |
|---|---|---|
| S | 7.96 | 7.96 |
| Cl | 52.80 | 52.35 |

Example 11

8.4 grams (0.019 mol) of 1-bromo-4,5,6,7,10,10-hexachloro-4,7-methylene-4,7,8,9-tetrahydrophthalane and 2.2 grams (0.020 mol) of phenyl mercaptan were heated for 5 hours on a water bath and the reaction product was crystallized in a refrigerator. Recrystallization from gasoline resulted in a 70% yield of 1-phenylmercapto-4,5,6,7,10,10 - hexachloro-4,7-methylene-4,7,8,9-tetrahydrophthalane.

Formula: $C_{15}H_{10}OSCl_6$. Molecular weight: 451.03.

|  | Calculated, percent | Found, percent |
|---|---|---|
| S | 7.11 | 7.22 |
| Cl | 47.18 | 47.76 |

Example 12

8.4 grams (0.019 mol) of 1-bromo-4,5,6,7,10,10-hexachloro - 4,7-methylene-4,7,8,9-tetrahydrophthalane and 20.5 grams (0.201 mol) of acetic anhydride were heated for 8 hours with the use of a reflux condenser. The reaction product obtained was freed from excessive acetic anhydride and acetyl bromide under vacuum. The crystalline residue was recrystallized from petroleum ether. The yield comprised 7.0 grams (87.5% of the theoretical yield) of 1-acetoxy-4,5,6,7,10,10-hexachloro-4,7-methylene-4,7,8,9-tetrahydrophthalane having a melting point of 129° C.

Formula: $C_{11}H_8O_3Cl_6$. Molecular weight: 400.92.

|  | Calculated, percent | Found, percent |
|---|---|---|
| C | 32.97 | 32.12 |
| H | 2.01 | 2.23 |
| O | 11.87 | 11.97 |
| Cl | 53.05 | 53.09 |

The compounds produced in accordance with the invention constitute good insecticides. The method of their use is the same as that conventional for known insecticides.

The compounds produced by the process of the invention may be formulated to dusting agents, emulsions, spray powders, sprays or aerosols.

Dusting agents and spray powders are prepared with the use of conventional inert diluents, e. g. talc, kaolin, bleaching earth, kieselguhr, limestone or calcined magnesia. Emulsions of the compounds of the invention can be prepared by means of acetone, benzene, xylene or other hydrocarbons as well as suitable higher alcohols. Use is made in this case of emulsifiers, e.g. high molecular weight condensation products of fatty alcohols and ethylene oxide, the addition of which in conventional manner results in a particularly satisfactory emulsification. Sprays and aerosols may be prepared by mixing the compounds of the invention with low boiling hydrocarbons. Suitable preparations are, for example, obtained by admixture of 90–99 parts of fluor-trichlormethane or di-fluor-dichlormethane.

As far as the compounds are soluble in organic solvents, it is preferable to use them dissolved in acetone or hydrocarbons, e.g. petroleum ether.

The insecticidal efficiency of compounds according to the invention was determined in the following manner:

One milligram of each of the compounds being tested and previously dissolved in petroleum ether or acetone was placed into flat dishes of 10 cm. in diameter provided with a vertical rim of about 1.5 cm. in width (Petri dishes). The solution was in each case evenly distributed over the bottom of the glass dishes and then the solvent was evaporated. Thereafter, 20 female animals of *Musca domestica* which were four days old were placed in each of the dishes. The mortality of the test animals was then determined as a function of the residence time of the animals.

The efficiencies of the compounds of the invention were as follows:

| Compounds | Percent mortality after— | | | |
|---|---|---|---|---|
|  | 1 hr. | 2 hrs. | 5 hrs. | 24 hrs. |
| 1 - propoxy - 4.5.6.7.10.10-hexachloro-4.7-methylene-4.7.8.9-tetrahydrophthalane | 90 | 90 | 95 | 100 |
| 1 - (β - chlorethoxy) - 4.5.6.7.10.10 - hexachloro - 4.7 - methylene - 4.7.8.9 - tetrahydrophthalane | 95 | 95 | 95 | 100 |
| 1 - allyloxy - 4.5.6.7.10.10 - hexachloro-4.7 - methylene - 4.7.8.9 - tetrahydrophthalane | 45 | 70 | 95 | 100 |
| 1 - ethylmercapto - 4.5.6.7.10.10 - hexachloro - 4.7 - methylene - 4.7.8.9 - tetrahydrophthalane | 35 | 80 | 80 | 100 |
| 1 - acetoxy - 4.5.6.7.10.10 - hexachloro - 4.7 - methylene - 4.7.8.9 - tetrahydrophthalane | 5 | 5 | 5 | 10 |

The data given above indicate that the process of the invention permits the production of compounds which possess a surprisingly high efficiency as insecticides.

We claim:

1. A tetrahydrophthalane derivative having the formula:

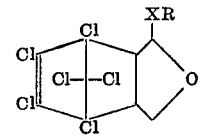

in which X is a member selected from the group consisting of O, S, and the

group, and R is a member selected from the group consisting of lower alkyl and lower olefinic radicals, the phenyl radical and monochloro-substituted members of said latter group.

2. A tetrahydrophthalane derivative having the formula:

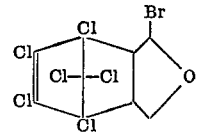

3. Process for the production of 1-ethers, thioethers and esters from hexachloro-methylene-tetrahydrophthalane, which comprises bromating 4,5,6,7,10,10-hexachloro-4,7-methylene-4,7,8,9-tetrahydrophthalane by reacting said 4,5,6,7,10,10-hexachloro-4,7, methylene-4,7,8,9-tetrahydrophthalane with bromine in the presence of ultra violet irradiations to thereby form 1-bromo-4,5,6,7,10,10-hexachloro - 4,7 - methylene-4,7,8,9-tetrahydrophthalane, and thereafter converting said 1-bromo-hexachloromethylene-tetrahydrophthalane with a member selected from the group consisting of lower alkyl alcohols, lower olefinic alcohols, phenol, ethyl mercaptan, phenyl mercaptan acetic acid anhydrochloride and monochloro-substituted members of said latter group, at a temperature between about 50 and 200° C., and recovering the reaction product formed.

4. Process for the production of 1-ethers, thioethers and esters from hexachloro-methylene-tetrahydrophthalane, which comprises bromating 4,5,6,7,10,10-hexachloro-4,7-methylene-4,7,8,9-tetrahydrophthalane by reacting said 4,5,6,7,10,10-hexachloro-4,7-methylene-4,7,8,9-tetrahydrophthalane with N-bromo-succinimide in the presence of benzoyl peroxide, to thereby form 1-bromo-4,5,6,7,10,10 - hexachloro-4,7-methylene-4,7,8,9-tetrahydrophthalane, and thereafter converting said 1-bromohexachloro-methylene-tetrahydrophthalane with a member selected from the group consisting of lower alkyl alcohols, lower olefinic alcohols, phenols, ethyl mercaptan, phenyl mercaptan and acetic acid anhydride and monochloro-substituted members of said group, at a temperature between about 50 and 200° C., and recovering the reaction product formed.

No references cited.

UNITED STATES PATENT OFFICE
CERTIFICATE OF CORRECTION

Patent No. 2,881,187                                        April 7, 1959

Hans Feichtinger et al.

It is hereby certified that error appears in the printed specification of the above numbered patent requiring correction and that the said Letters Patent should read as corrected below.

Column 2, line 61, for "Formula: $C_9H_5OCl_5Br$." read -- Formula: $C_9H_5OCl_6Br$. --; column 4, line 6, in the table, first column thereof, for "G" read -- C --; column 5, lines 65 and 66, for "emulsication" read -- emulsification; column 6, line 72, for "anhydrochloride" read -- anhydride --; column 8, line 3, for "phenols" read -- phenol --.

Signed and sealed this 21st day of July 1959.

(SEAL)
Attest:

KARL H. AXLINE
Attesting Officer

ROBERT C. WATSON
Commissioner of Patents